United States Patent [19]
Perina

[11] 3,718,009
[45] Feb. 27, 1973

[54] BREAKAWAY CLUTCH

[75] Inventor: Joseph Perina, Huntington, N.Y.

[73] Assignee: American Velcro, Inc., Manchester, N.H.

[22] Filed: March 26, 1971

[21] Appl. No.: 128,239

[52] U.S. Cl. .................64/28 R, 24/DIG. 18, 161/53, 192/56 R, 192/67 R, 192/107 M
[51] Int. Cl. ...........................F16d 7/00, F16d 43/20
[58] Field of Search ..............192/56 R, 67 R, 107 M; 24/DIG. 18; 2/DIG. 6; 161/53; 64/30 C, 28 R

[56] References Cited

UNITED STATES PATENTS

| 2,974,503 | 3/1961 | Newton | 64/30 C |
| 3,143,895 | 8/1964 | Robie | 192/107 M X |
| 3,136,400 | 6/1964 | Carr | 192/56 R |
| 2,778,468 | 1/1957 | Babaian | 192/56 R |
| 3,240,304 | 3/1966 | Wickersham | 192/67 R X |
| 2,733,622 | 2/1956 | Evans | 192/56 R X |
| 3,522,681 | 8/1970 | Lampert | 24/DIG. 18 |
| 3,617,426 | 3/1969 | Grundman | 192/107 M |

*Primary Examiner*—Allan D. Herrmann
*Attorney*—Pennie, Edmonds, Morton, Taylor & Adams

[57] ABSTRACT

A power transmission clutch has driving and driven members which are interconnected by means of hooking elements and these members are so supported that they can move out of contact with each other if and when the torque transmitted exceeds the capacity of the hooking elements.

The clutch can be used to transmit power to the propeller of a small boat from the shaft of the boat engine. In this case the device is so constructed that the propeller cannot be lost should disengagement of the hooking elements on the driving and driven members occur.

2 Claims, 6 Drawing Figures

PATENTED FEB 27 1973 3,718,009

INVENTOR
Joseph Perina
BY
Morton, Sayle & Adams
ATTORNEYS

BREAKAWAY CLUTCH

SUMMARY OF THE INVENTION

The clutch has two cooperating components having circular interengaging surfaces of hooking elements. These surfaces can breakaway whenever the torque transmitted rises to a predetermined value. Before breakaway occurs such a clutch provides shock-absorbing properties. The torque value at which breakaway takes place can be varied in various ways such for example as by providing the interengaging surfaces with different numbers of hooking elements per square inch, or by using different types of hooking elements on the cooperating components. Thus the cooperating hooking elements may be of the hook type on the driving component and of the loop type on the driven member, or hook and hook, or hook and pile elements may be used. However the intention is to use a hooking element fabric mounted on the cooperating faces of the clutch components, such fabric being manufactured as a fastener and sold under the tradename "Velcro" by American Velcro Corporation of 681 Fifth Avenue, New York, N.Y. 10022. This fabric contains many heat-set, semi-rigid nylon hooks per square inch. These hooks, when pressed into a cooperating fabric capable of engaging with these hooks produce a strong fastener which can be attached and detached thousands of times by merely pressing the parts together and pulling them apart.

The clutch components of the present invention have circular interengaging surfaces which may be formed by securing the fabrics above mentioned to the respective clutch members, or the hook members and their cooperating members may be respectively bonded to the clutch components in any suitable and convenient way. However the invention provides for arranging the hooks on the driving member of the clutch in a generally circular arrangement so that the hooks face all in the same general direction.

One use for the breakaway clutch of the present invention is for driving the propeller of a small boat, the driving element of the clutch being connected to the drive shaft of the boat engine, for example the shaft of an outboard motor, and the driven member of the clutch being mounted on the propeller shaft. Thus should the propeller strike a hard object such as a stone or rock during the operation of the boat, the breakaway clutch serves to disconnect the propeller from the motor and prevent damage thereto. Advantageously the clutch construction of the invention provides for capturing, or retaining the propeller on the drive shaft, should disengagement of the clutch elements occur, so as to prevent the loss of the propeller.

DETAILED DESCRIPTION

Figure 1:
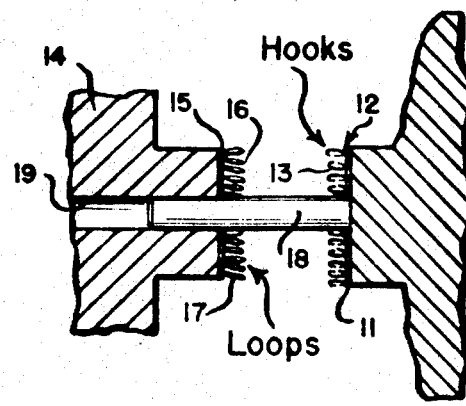
FIG. 1 is a view in vertical central section of one form of the breakaway clutch.
Figure 2:
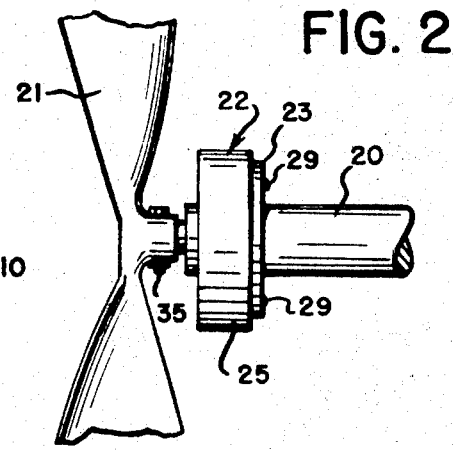
FIG. 2 is a side elevation of a breakaway clutch mechanism employed for connecting a propeller to its driving shaft.

Referring to FIG. 1 a clutch driving element 10 has a circular face 11 to which is bonded a fabric 12 the surface of which is provided with a multiplicity of hook elements.

The driven member 14 of the clutch has a circular face 15 which corresponds to the face 11 of the driving member, and bonded to this face is a fabric 16 provided with a multiplicity of loop elements 17. An elongated pin 18 at the center of driving element 10 extends into a circular opening 19 in driven element 14 to maintain the clutch parts in axial alignment at all times.

Referring now to FIGS. 2–6 the drive shaft of a boat engine is indicated at 20, and a propeller at 21. A housing 22 encloses the elements of the breakaway clutch. This housing comprises a circular member 23 which is shown as being integral with drive shaft 20, but usually would be removably mounted on this shaft. Member 23 has a cylindrical portion 24 onto which the cylindrical portion 25 of an outer housing member 26 is secured by means of the screw threads shown.

Secured to drive shaft 20 is a circular drive plate 27 which forms the driving member of the breakaway clutch which is indicated generally by numeral 28. This plate may be secured in place by means of pins or rivets 29, or in any suitable way. On the face of plate 27 a multiplicity of hook members 30 are bonded. These members are illustrated generally in FIG. 2 and they face in various directions. As illustrated they are bonded directly to the face of plate 27, but they may be manufactured as a part of a fabric as described in connection with FIG. 1, and this fabric bonded to the face of plate 27.

The loops 31 which cooperate with hooks 30 of the clutch 28 are mounted on the face of a flange 32 which is shown as being integral with the front end of a short propeller shaft 33. This shaft extends through a bearing 34 supported at the center of outer housing member 26. Propeller 21 is secured in any suitable way, as by means of a pin 35 to the outer end portion of shaft 33.

Figure 3:
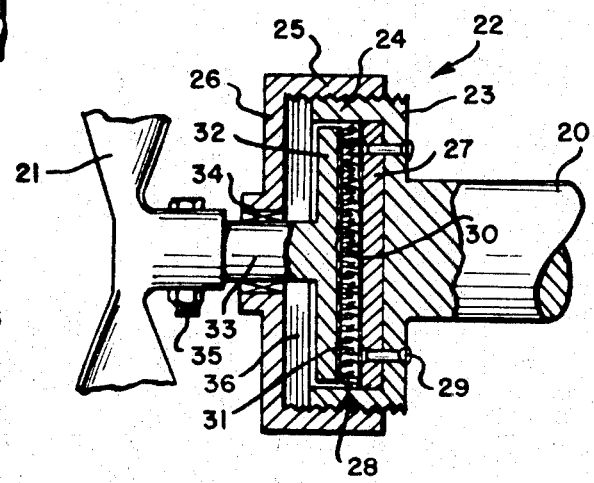
FIG. 3 is a view partly in central vertical section and partly in elevation of the arrangement shown in FIG. 2.
Figure 4:
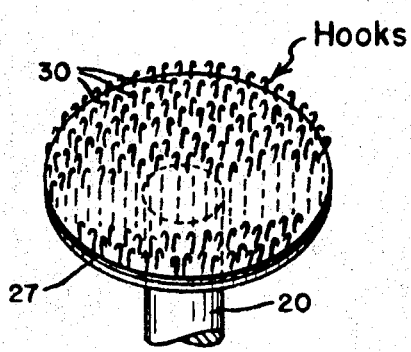
FIG. 4 is a perspective view showing the general arrangement of the hooks on the driving element of FIG. 3.

It will be understood from FIG. 3 that should propeller 21 strike some object in the water and be restrained from rotating, the hooks 30 and loops 31 will be disengaged. If desired space 36 may be reduced by turning the outer housing member 26 on the screw threads so as to bring the inner face of this member closer to the end of cylindrical portion 24. This may be desirable in order to provide a firm contact between the hook and loop elements when slippage of the clutch occurs and the hooks and loops slip past each other. Upon removal of the predetermined torque that causes said slippage the hook and loop elements reengage as a natural consequence and resume transmission of rotational torque.

Figure 5:
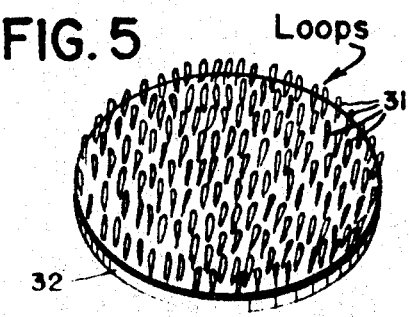
FIG. 5 is a similar view showing loop elements on the driven member of the clutch of FIG. 3.

The general arrangement of loops 31 on the face of flange 32 is shown in FIG. 5 and it will be understood that these loops do not face in any special direction.

Figure 6:
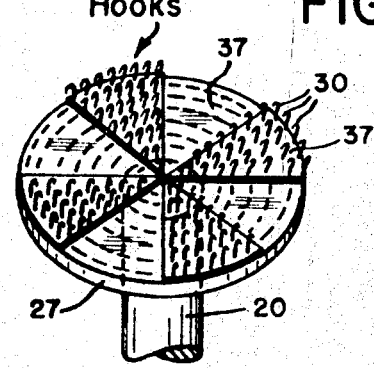
FIG. 6 is a view similar to FIG. 4 with the hook elements facing in the same general direction.

In order to increase the torque value at which the clutch 28 will become disengaged the arrangement of the hooks shown in FIG. 6 may be employed. Here it will be understood that the hooks are mounted on the surface of a fabric, and that this fabric is cut into a plurality of pie-shaped sections 37, hooks 30 being arranged in approximately parallel rows in each section, with the the hooks facing all in the same direction. Thus as shown in FIG. 6 all of the hooks 30 face in the counter clockwise direction around plate 27. This results in a larger proportion of the hooks 30 engaging the loops 31 when the elements of clutch 28 are in engaged position.

It will be understood that with the clutch as described in connection with FIGS. 2–5 or 2–6, propeller 21 may stop rotating while the engine shaft 20 continues to rotate but the propeller will be retained in position attached to the propeller shaft so that the propeller will not be lost.

I claim:

1. A torque breakaway clutch for transmitting rotational torque from a driving shaft member to a driven shaft member comprising:

a. driving and driven members having interengaging oppositely faced surfaces of mating hook and loop-type elements positioned in face-to-face relation, said hooks facing in substantially the same generally circumferential direction over the surface of at least one of said clutch members, the hooks and loops being of the type wherein a large number of hooks engage a large number of loops and resist separation parallel to the interfacial plane of engagement, but are readily separable by peeling forces substantially normal to the interfacial plane; and b. means for supporting said clutch members in face-to-face relation while a rotational torque is transmitted from the driving shaft member to the driven shaft member, said clutch members being characterized by the property that when a predetermined torque is applied sufficient to exceed the engagement of said elements in a direction parallel to the interfacial plane, the hook and loop-type elements breakaway and slip past one another during the application of said predetermined torque, but upon removal thereof, said elements reengage and resume transmission of rotational torque from the driving shaft member to the driven shaft member.

2. The power transmission clutch according to claim 1 wherein the clutch members are circular flange members and the hook and loop-type hooking elements project from fabrics bonded to the surfaces of said clutch members, the hook-type elements of at least the driving member projecting from wedge-shaped sections of said fabric and arranged to be facing in the same generally circumferential direction of rotation, thereby facilitating a maximum torque breakaway value for said clutch.

* * * * *